(12) United States Patent
Charbonnier et al.

(10) Patent No.: US 12,554,841 B2
(45) Date of Patent: Feb. 17, 2026

(54) ELECTRONIC SYSTEM AND METHODS FOR DYNAMIC ACTIVATION OF COUNTERMEASURES

(71) Applicant: THALES DIS FRANCE SAS, Meudon (FR)

(72) Inventors: Sylvain Charbonnier, Marseilles (FR); Jean Roch Coulon, Le Tholonet (FR); Vincent Dumas, Auriol (FR); André Sintzoff, Marseilles (FR)

(73) Assignee: THALES DIS FRANCE SAS, Meudon (FR)

( * ) Notice: Subject to any disclaimer, the term of this patent is extended or adjusted under 35 U.S.C. 154(b) by 638 days.

(21) Appl. No.: 17/783,688

(22) PCT Filed: Dec. 18, 2020

(86) PCT No.: PCT/FR2020/052559
§ 371 (c)(1),
(2) Date: Jun. 9, 2022

(87) PCT Pub. No.: WO2021/123684
PCT Pub. Date: Jun. 24, 2021

(65) Prior Publication Data
US 2023/0080096 A1 Mar. 16, 2023

(30) Foreign Application Priority Data

Dec. 18, 2019 (FR) .................... 19306680.0

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06F 21/552
See application file for complete search history.

(56) References Cited

U.S. PATENT DOCUMENTS

| 2002/0059480 A1* | 5/2002 | Matsuura | G06F 8/61 710/1 |
| 2006/0143509 A1* | 6/2006 | Okawa | G06F 11/1052 714/E11.144 |

(Continued)

FOREIGN PATENT DOCUMENTS

EP    3376423 A1    9/2018

OTHER PUBLICATIONS

International Search Report (PCT/ISA/210) and Written Opinion (PCT/ISA/237) mailed on Apr. 16, 2021, by the European Patent Office as the International Searching Authority for current International Application No. PCT/EP2020/052559- [13 pages].

*Primary Examiner* — Paul R Fisher

(57) ABSTRACT

Provided is a method for configuring an electronic system for a secure execution of a code comprising a plurality of functions. The electronic system is configured for applying during an execution of a function a security countermeasure configuration among a plurality of security countermeasure configurations. The method is performed by said electronic system comprising a hardware processor, security hardware registers configured for storing start addresses of functions among said plurality of functions and associated security countermeasure configurations to be applied during an execution of said functions. A detection system is configured to detect an attack on said electronic system during an execution of a function among said plurality of functions.

8 Claims, 5 Drawing Sheets

Specification includes a Sequence Listing.

(56) References Cited

U.S. PATENT DOCUMENTS

| | | | |
|---|---|---|---|
| 2013/0024679 A1* | 1/2013 | Isozaki | G06F 21/31 |
| | | | 713/2 |
| 2013/0055025 A1* | 2/2013 | Feix | G06F 21/554 |
| | | | 714/E11.178 |
| 2016/0092378 A1* | 3/2016 | Vedala | G06F 21/554 |
| | | | 711/163 |
| 2016/0300056 A1* | 10/2016 | Tashiro | G06F 9/30054 |
| 2018/0114012 A1* | 4/2018 | Sood | G06F 21/79 |
| 2018/0295519 A1* | 10/2018 | Nandha Premnath | |
| | | | H04L 63/1425 |
| 2018/0307835 A1 | 10/2018 | Buch | |
| 2019/0080096 A1* | 3/2019 | Savry | G06F 21/44 |
| 2019/0188391 A1 | 6/2019 | Margalit | |

* cited by examiner

SEQUENCE LISTING

```
<160> NUMBER OF SEQ ID NOS: 8

<210> SEQ ID NO 1
<211> LENGTH: 742
<212> TYPE: PRT
<213> ORGANISM: Homo sapiens

<400> SEQUENCE: 1

Met Lys Asp Asp Phe Ala Glu Glu Glu Val Gln Ser Phe Gly Tyr
1               5                   10                  15

Lys Arg Phe Gly Ile Gln Glu Gly Thr Gln Cys Thr Lys Cys Lys Asn
            20                  25                  30

Asn Trp Ala Leu Lys Phe Ser Ile Ile Leu Leu Tyr Ile Leu Cys Ala
        35                  40                  45

Leu Leu Thr Ile Thr Val Ala Ile Leu Gly Tyr Lys Val Val Glu Lys
    50                  55                  60

Met Asp Asn Val Thr Gly Gly Met Glu Thr Ser Arg Gln Thr Tyr Asp
65                  70                  75                  80

Asp Lys Leu Thr Ala Val Glu Ser Asp Leu Lys Lys Leu Gly Asp Gln
            85                  90                  95

Thr Gly Lys Lys Ala Ile Ser Thr Asn Ser Glu Leu Ser Thr Phe Arg
            100                 105                 110

Ser Asp Ile Leu Asp Leu Arg Gln Gln Leu Arg Glu Ile Thr Glu Lys
        115                 120                 125

Thr Ser Lys Asn Lys Asp Thr Leu Glu Lys Leu Gln Ala Ser Gly Asp
    130                 135                 140

Ala Leu Val Asp Arg Gln Ser Gln Leu Lys Glu Thr Leu Glu Asn Asn
145                 150                 155                 160

Ser Phe Leu Ile Thr Thr Val Asn Lys Thr Leu Gln Ala Tyr Asn Gly
            165                 170                 175

Tyr Val Thr Asn Leu Gln Gln Asp Thr Ser Val Leu Gln Gly Asn Leu
```

```
                180                 185                 190
Gln Asn Gln Met Tyr Ser His Asn Val Val Ile Met Asn Leu Asn Asn
            195                 200                 205
Leu Asn Leu Thr Gln Val Gln Gln Arg Asn Leu Ile Thr Asn Leu Gln
            210                 215                 220
Arg Ser Val Asp Asp Thr Ser Gln Ala Ile Gln Arg Ile Lys Asn Asp
225                 230                 235                 240
Phe Gln Asn Leu Gln Gln Val Phe Leu Gln Ala Lys Lys Asp Thr Asp
                245                 250                 255
Trp Leu Lys Glu Lys Val Gln Ser Leu Gln Thr Leu Ala Ala Asn Asn
            260                 265                 270
Ser Ala Leu Ala Lys Ala Asn Asn Asp Thr Leu Glu Asp Met Asn Ser
        275                 280                 285
Gln Leu Asn Ser Phe Thr Gly Gln Met Glu Asn Ile Thr Thr Ile Ser
        290                 295                 300
Gln Ala Asn Glu Gln Asn Leu Lys Asp Leu Gln Asp Leu His Lys Asp
305                 310                 315                 320
Ala Glu Asn Arg Thr Ala Ile Lys Phe Asn Gln Leu Glu Glu Arg Phe
                325                 330                 335
Gln Leu Phe Glu Thr Asp Ile Val Asn Ile Ile Ser Asn Ile Ser Tyr
                340                 345                 350
Thr Ala His His Leu Arg Thr Leu Thr Ser Asn Leu Asn Glu Val Arg
            355                 360                 365
Thr Thr Cys Thr Asp Thr Leu Thr Lys His Thr Asp Asp Leu Thr Ser
        370                 375                 380
Leu Asn Asn Thr Leu Ala Asn Ile Arg Leu Asp Ser Val Ser Leu Arg
385                 390                 395                 400
Met Gln Gln Asp Leu Met Arg Ser Arg Leu Asp Thr Glu Val Ala Asn
                405                 410                 415
Leu Ser Val Ile Met Glu Glu Met Lys Leu Val Asp Ser Lys His Gly
            420                 425                 430
Gln Leu Ile Lys Asn Phe Thr Ile Leu Gln Gly Pro Pro Gly Pro Arg
            435                 440                 445
Gly Pro Arg Gly Asp Arg Gly Ser Gln Gly Pro Pro Gly Pro Thr Gly
        450                 455                 460
Asn Lys Gly Gln Lys Gly Glu Lys Gly Glu Pro Gly Pro Pro Gly Pro
465                 470                 475                 480
Ala Gly Glu Arg Gly Pro Ile Gly Pro Ala Gly Pro Pro Gly Glu Arg
                485                 490                 495
Gly Gly Lys Gly Ser Lys Gly Ser Gln Gly Pro Lys Gly Ser Arg Gly
            500                 505                 510
Ser Pro Gly Lys Pro Gly Pro Gln Gly Ser Ser Gly Asp Pro Gly Pro
        515                 520                 525
Pro Gly Pro Pro Gly Lys Glu Gly Leu Pro Gly Pro Gln Gly Pro Pro
        530                 535                 540
Gly Phe Gln Gly Leu Gln Gly Thr Val Gly Glu Pro Gly Val Pro Gly
545                 550                 555                 560
Pro Arg Gly Leu Pro Gly Leu Pro Gly Val Pro Gly Met Pro Gly Pro
                565                 570                 575
Lys Gly Pro Pro Gly Pro Pro Gly Pro Ser Gly Ala Val Val Pro Leu
            580                 585                 590
Ala Leu Gln Asn Glu Pro Thr Pro Ala Pro Glu Asp Asn Gly Cys Pro
        595                 600                 605
```

```
Pro His Trp Lys Asn Phe Thr Asp Lys Cys Tyr Tyr Phe Ser Val Glu
    610                 615                 620

Lys Glu Ile Phe Glu Asp Ala Lys Leu Phe Cys Glu Asp Lys Ser Ser
625                 630                 635                 640

His Leu Val Phe Ile Asn Thr Arg Glu Gln Gln Trp Ile Lys Lys
            645                 650                 655

Gln Met Val Gly Arg Glu Ser His Trp Ile Gly Leu Thr Asp Ser Glu
            660                 665                 670

Arg Glu Asn Glu Trp Lys Trp Leu Asp Gly Thr Ser Pro Asp Tyr Lys
            675                 680                 685

Asn Trp Lys Ala Gly Gln Pro Asp Asn Trp Gly His Gly His Gly Pro
690                 695                 700

Gly Glu Asp Cys Ala Gly Leu Ile Tyr Ala Gly Gln Trp Asn Asp Phe
705                 710                 715                 720

Gln Cys Glu Asp Val Asn Asn Phe Ile Cys Glu Lys Asp Arg Glu Thr
                725                 730                 735

Val Leu Ser Ser Ala Leu
            740

<210> SEQ ID NO 2
<211> LENGTH: 293
<212> TYPE: PRT
<213> ORGANISM: Homo sapiens

<400> SEQUENCE: 2

Met Asp Thr Thr Arg Tyr Ser Lys Trp Gly Ser Ser Glu Glu Val
1               5                   10                  15

Pro Gly Gly Pro Trp Gly Arg Trp Val His Trp Ser Arg Arg Pro Leu
            20                  25                  30

Phe Leu Ala Leu Ala Val Leu Val Thr Thr Val Leu Trp Ala Val Ile
            35                  40                  45

Leu Ser Ile Leu Leu Ser Lys Ala Ser Thr Glu Arg Ala Ala Leu Leu
    50                  55                  60

Asp Gly His Asp Leu Leu Arg Thr Asn Ala Ser Lys Gln Thr Ala Ala
65                  70                  75                  80

Leu Gly Ala Leu Lys Glu Glu Val Gly Asp Cys His Ser Cys Cys Ser
                85                  90                  95

Gly Thr Gln Ala Gln Leu Gln Thr Thr Arg Ala Glu Leu Gly Glu Ala
            100                 105                 110

Gln Ala Lys Leu Met Glu Gln Glu Ser Ala Leu Arg Glu Leu Arg Glu
            115                 120                 125

Arg Val Thr Gln Gly Leu Ala Glu Ala Gly Arg Gly Arg Glu Asp Val
            130                 135                 140

Arg Thr Glu Leu Phe Arg Ala Leu Glu Ala Val Arg Leu Gln Asn Asn
145                 150                 155                 160

Ser Cys Glu Pro Cys Pro Thr Ser Trp Leu Ser Phe Glu Gly Ser Cys
                165                 170                 175

Tyr Phe Phe Ser Val Pro Lys Thr Thr Trp Ala Ala Ala Gln Asp His
            180                 185                 190

Cys Ala Asp Ala Ser Ala His Leu Val Ile Val Gly Gly Leu Asp Glu
            195                 200                 205

Gln Gly Phe Leu Thr Arg Asn Thr Arg Gly Arg Gly Tyr Trp Leu Gly
    210                 215                 220

Leu Arg Ala Val Arg His Leu Gly Lys Val Gln Gly Tyr Gln Trp Val
```

```
                225                 230                 235                 240

Asp Gly Val Ser Leu Ser Phe Ser His Trp Asn Gln Gly Glu Pro Asn
                245                 250                 255

Asp Ala Trp Gly Arg Glu Asn Cys Val Met Met Leu His Thr Gly Leu
                260                 265                 270

Trp Asn Asp Ala Pro Cys Asp Ser Glu Lys Asp Gly Trp Ile Cys Glu
                275                 280                 285

Lys Arg His Asn Cys
                290

<210> SEQ ID NO 3
<211> LENGTH: 328
<212> TYPE: PRT
<213> ORGANISM: Homo sapiens

<400> SEQUENCE: 3

Met Thr Val Glu Lys Glu Ala Pro Asp Ala His Phe Thr Val Asp Lys
1               5                   10                  15

Gln Asn Ile Ser Leu Trp Pro Arg Glu Pro Pro Lys Ser Gly Pro
                20                  25                  30

Ser Leu Val Pro Gly Lys Thr Pro Thr Val Arg Ala Ala Leu Ile Cys
                35                  40                  45

Leu Thr Leu Val Leu Val Ala Ser Val Leu Gln Ala Val Leu Tyr
    50                  55                  60

Pro Arg Phe Met Gly Thr Ile Ser Asp Val Lys Thr Asn Val Gln Leu
65                  70                  75                  80

Leu Lys Gly Arg Val Asp Asn Ile Ser Thr Leu Asp Ser Glu Ile Lys
                85                  90                  95

Lys Asn Ser Asp Gly Met Glu Ala Ala Gly Val Gln Ile Gln Met Val
                100                 105                 110

Asn Glu Ser Leu Gly Tyr Val Arg Ser Gln Phe Leu Lys Leu Lys Thr
                115                 120                 125

Ser Val Glu Lys Ala Asn Ala Gln Ile Gln Ile Leu Thr Arg Ser Trp
    130                 135                 140

Glu Glu Val Ser Thr Leu Asn Ala Gln Ile Pro Glu Leu Lys Ser Asp
145                 150                 155                 160

Leu Glu Lys Ala Ser Ala Leu Asn Thr Lys Ile Arg Ala Leu Gln Gly
                165                 170                 175

Ser Leu Glu Asn Met Ser Lys Leu Leu Lys Arg Gln Asn Asp Ile Leu
                180                 185                 190

Gln Val Val Ser Gln Gly Trp Lys Tyr Phe Lys Gly Asn Phe Tyr Tyr
                195                 200                 205

Phe Ser Leu Ile Pro Lys Thr Trp Tyr Ser Ala Glu Gln Phe Cys Val
    210                 215                 220

Ser Arg Asn Ser His Leu Thr Ser Val Thr Ser Glu Ser Glu Gln Glu
225                 230                 235                 240

Phe Leu Tyr Lys Thr Ala Gly Gly Leu Ile Tyr Trp Ile Gly Leu Thr
                245                 250                 255

Lys Ala Gly Met Glu Gly Asp Trp Ser Trp Val Asp Asp Thr Pro Phe
                260                 265                 270

Asn Lys Val Gln Ser Val Arg Phe Trp Ile Pro Gly Glu Pro Asn Asn
                275                 280                 285

Ala Gly Asn Asn Glu His Cys Gly Asn Ile Lys Ala Pro Ser Leu Gln
                290                 295                 300
```

Ala Trp Asn Asp Ala Pro Cys Asp Lys Thr Phe Leu Phe Ile Cys Lys
305                 310                 315                 320

Arg Pro Tyr Val Pro Ser Glu Pro
                325

<210> SEQ ID NO 4
<211> LENGTH: 316
<212> TYPE: PRT
<213> ORGANISM: Homo sapiens

<400> SEQUENCE: 4

Met Thr Arg Thr Tyr Glu Asn Phe Gln Tyr Leu Glu Asn Lys Val Lys
1               5                   10                  15

Val Gln Gly Phe Lys Asn Gly Pro Leu Pro Leu Gln Ser Leu Leu Gln
                20                  25                  30

Arg Leu Cys Ser Gly Pro Cys His Leu Leu Ser Gly Leu Gly
            35                  40                  45

Leu Leu Leu Leu Val Ile Ile Cys Val Val Gly Phe Gln Asn Ser Lys
        50                  55                  60

Phe Gln Arg Asp Leu Val Thr Leu Arg Thr Asp Phe Ser Asn Phe Thr
65                  70                  75                  80

Ser Asn Thr Val Ala Glu Ile Gln Ala Leu Thr Ser Gln Gly Ser Ser
                85                  90                  95

Leu Glu Glu Thr Ile Ala Ser Leu Lys Ala Glu Val Gly Phe Lys
                100                 105                 110

Gln Glu Arg Gln Ala Gly Val Ser Glu Leu Gln Glu His Thr Thr Gln
            115                 120                 125

Lys Ala His Leu Gly His Cys Pro His Cys Pro Ser Val Cys Val Pro
130                 135                 140

Val His Ser Glu Met Leu Leu Arg Val Gln Gln Leu Val Gln Asp Leu
                145                 150                 155                 160

Lys Lys Leu Thr Cys Gln Val Ala Thr Leu Asn Asn Asn Ala Ser Thr
                165                 170                 175

Glu Gly Thr Cys Cys Pro Val Asn Trp Val Glu His Gln Asp Ser Cys
            180                 185                 190

Tyr Trp Phe Ser His Ser Gly Met Ser Trp Ala Glu Ala Glu Lys Tyr
        195                 200                 205

Cys Gln Leu Lys Asn Ala His Leu Val Val Ile Asn Ser Arg Glu Glu
    210                 215                 220

Gln Asn Phe Val Gln Lys Tyr Leu Gly Ser Ala Tyr Thr Trp Met Gly
225                 230                 235                 240

Leu Ser Asp Pro Glu Gly Ala Trp Lys Trp Val Asp Gly Thr Asp Tyr
                245                 250                 255

Ala Thr Gly Phe Gln Asn Trp Lys Pro Gly Gln Pro Asp Asp Trp Gln
                260                 265                 270

Gly His Gly Leu Gly Gly Gly Glu Asp Cys Ala His Phe His Pro Asp
            275                 280                 285

Gly Arg Trp Asn Asp Asp Val Cys Gln Arg Pro Tyr His Trp Val Cys
        290                 295                 300

Glu Ala Gly Leu Gly Gln Thr Ser Gln Glu Ser His
305                 310                 315

<210> SEQ ID NO 5
<211> LENGTH: 139
<212> TYPE: PRT
<213> ORGANISM: Homo sapiens

<400> SEQUENCE: 5

Asp Asn Gly Cys Pro Pro His Trp Lys Asn Phe Thr Asp Lys Cys Tyr
1               5                   10                  15

Tyr Phe Ser Val Glu Lys Glu Ile Phe Glu Asp Ala Lys Leu Phe Cys
            20                  25                  30

Glu Asp Lys Ser Ser His Leu Val Phe Ile Asn Thr Arg Glu Glu Gln
        35                  40                  45

Gln Trp Ile Lys Lys Gln Met Val Gly Arg Glu Ser His Trp Ile Gly
    50                  55                  60

Leu Thr Asp Ser Glu Arg Glu Asn Glu Trp Lys Trp Leu Asp Gly Thr
65                  70                  75                  80

Ser Pro Asp Tyr Lys Asn Trp Lys Ala Gly Gln Pro Asp Asn Trp Gly
                85                  90                  95

His Gly His Gly Pro Gly Glu Asp Cys Ala Gly Leu Ile Tyr Ala Gly
            100                 105                 110

Gln Trp Asn Asp Phe Gln Cys Glu Asp Val Asn Asn Phe Ile Cys Glu
        115                 120                 125

Lys Asp Arg Glu Thr Val Leu Ser Ser Ala Leu
    130                 135

<210> SEQ ID NO 6
<211> LENGTH: 132
<212> TYPE: PRT
<213> ORGANISM: Homo sapiens

<400> SEQUENCE: 6

Cys Glu Pro Cys Pro Thr Ser Trp Leu Ser Phe Glu Gly Ser Cys Tyr
1               5                   10                  15

Phe Phe Ser Val Pro Lys Thr Thr Trp Ala Ala Ala Gln Asp His Cys
            20                  25                  30

Ala Asp Ala Ser Ala His Leu Val Ile Val Gly Gly Leu Asp Glu Gln
        35                  40                  45

Gly Phe Leu Thr Arg Asn Thr Arg Gly Arg Gly Tyr Trp Leu Gly Leu
    50                  55                  60

Arg Ala Val Arg His Leu Gly Lys Val Gln Gly Tyr Gln Trp Val Asp
65                  70                  75                  80

Gly Val Ser Leu Ser Phe Ser His Trp Asn Gln Gly Glu Pro Asn Asp
                85                  90                  95

Ala Trp Gly Arg Glu Asn Cys Val Met Met Leu His Thr Gly Leu Trp
            100                 105                 110

Asn Asp Ala Pro Cys Asp Ser Glu Lys Asp Gly Trp Ile Cys Glu Lys
        115                 120                 125

Arg His Asn Cys
    130

<210> SEQ ID NO 7
<211> LENGTH: 137
<212> TYPE: PRT
<213> ORGANISM: Homo sapiens

<400> SEQUENCE: 7

Leu Gln Val Val Ser Gln Gly Trp Lys Tyr Phe Lys Gly Asn Phe Tyr
1               5                   10                  15

Tyr Phe Ser Leu Ile Pro Lys Thr Trp Tyr Ser Ala Glu Gln Phe Cys
            20                  25                  30

-continued

```
Val Ser Arg Asn Ser His Leu Thr Ser Val Thr Ser Glu Ser Glu Gln
        35                  40              45

Glu Phe Leu Tyr Lys Thr Ala Gly Gly Leu Ile Tyr Trp Ile Gly Leu
50                      55                  60

Thr Lys Ala Gly Met Glu Gly Asp Trp Ser Trp Val Asp Asp Thr Pro
65                  70                  75                  80

Phe Asn Lys Val Gln Ser Val Arg Phe Trp Ile Pro Gly Glu Pro Asn
                85                  90                  95

Asn Ala Gly Asn Asn Glu His Cys Gly Asn Ile Lys Ala Pro Ser Leu
            100                 105                 110

Gln Ala Trp Asn Asp Ala Pro Cys Asp Lys Thr Phe Leu Phe Ile Cys
            115                 120                 125

Lys Arg Pro Tyr Val Pro Ser Glu Pro
130                 135

<210> SEQ ID NO 8
<211> LENGTH: 140
<212> TYPE: PRT
<213> ORGANISM: Homo sapiens

<400> SEQUENCE: 8

Glu Gly Thr Cys Cys Pro Val Asn Trp Val Glu His Gln Asp Ser Cys
1               5                   10                  15

Tyr Trp Phe Ser His Ser Gly Met Ser Trp Ala Glu Ala Glu Lys Tyr
            20                  25                  30

Cys Gln Leu Lys Asn Ala His Leu Val Val Ile Asn Ser Arg Glu Glu
            35                  40                  45

Gln Asn Phe Val Gln Lys Tyr Leu Gly Ser Ala Tyr Thr Trp Met Gly
50                  55                  60

Leu Ser Asp Pro Glu Gly Ala Trp Lys Trp Val Asp Gly Thr Asp Tyr
65                  70                  75                  80

Ala Thr Gly Phe Gln Asn Trp Lys Pro Gly Gln Pro Asp Asp Trp Gln
            85                  90                  95

Gly His Gly Leu Gly Gly Gly Glu Asp Cys Ala His Phe His Pro Asp
            100                 105                 110

Gly Arg Trp Asn Asp Asp Val Cys Gln Arg Pro Tyr His Trp Val Cys
            115                 120                 125

Glu Ala Gly Leu Gly Gln Thr Ser Gln Glu Ser His
130                 135                 140
```

ELECTRONIC SYSTEM AND METHODS
FOR DYNAMIC ACTIVATION OF
COUNTERMEASURES

FIELD OF THE INVENTION

The present invention relates to the field of securing software execution on an electronic device against attacks, and more particularly to a method for a dynamic activation of countermeasures.

BACKGROUND OF THE INVENTION

Software execution on an electronic device may be subject to various attacks that enable an attacker to modify maliciously the software code execution on the electronic device or to gain knowledge of sensitive data stored on the secure device, such as secret cryptographic keys or banking information.

Various countermeasures have been designed in order to prevent or resist such attacks. One major drawback of such countermeasure is usually their heavy cost that slows down the execution code on a protected electronic device when such countermeasures are activated.

In order to avoid a permanent activation of multiple countermeasures, each designed against a different type of attacks, at a very high cost, methods have been proposed in order to activate such countermeasures only when specific code parts, which require a high level of protection, are executed. Such methods usually requires to manually modify the software code to be protected in order to add activation and deactivation commands of each needed countermeasure, at the beginning and the end of each code part to be protected by some countermeasure.

Such methods are very cumbersome for the code designers. They may also have a noticeable impact on the code size. In addition, even though their cost in terms of execution time is less than the one of methods implying a permanent activation of the countermeasure, they still induce an overhead that does not take into account the execution environment of the protected electronic device and will remain the same even when the device is not the target of any attack.

Consequently there is a need for a software secure execution method on an electronic device which enables to protect only code parts that suffer from attacks, with a minimal code footprint and execution time overhead.

SUMMARY OF THE INVENTION

For this purpose and according to a first aspect, this invention therefore relates to a method for configuring an electronic system for a secure execution of a code comprising a plurality of functions,
said electronic system being configured for applying during an execution of a function a security countermeasure configuration among a plurality of security countermeasure configurations,
said method being performed by said electronic system comprising a hardware processor, security hardware registers configured for storing start addresses of functions among said plurality of functions and associated security countermeasure configurations to be applied during an execution of said functions, a detection system configured to detect an attack on said electronic system during an execution of a function among said plurality of functions, and comprising:

detecting, by said detection system, an attack on said electronic system during an execution of a first function,
  selecting, based on said detected attack, a security countermeasure configuration to be applied during an execution of said first function,
  storing, in a security hardware register, said first function start address and said selected security countermeasure configuration to be applied during an execution of said first function.

It enables to memorize the functions which need to be protected because they already suffered attacks and the countermeasures to be applied during a future execution of the function in order to protect it from similar attacks.

In an embodiment, said electronic system comprises further a backup memory, and the start address of said first function and said selected security countermeasure configuration stored in said security hardware register are copied from said security hardware register to said backup memory after said detection of an attack and, at boot of the electronic system, the start addresses and associated security countermeasure configurations stored in said backup memory are copied from said backup memory to said security hardware registers.

It enables to prevent any loss of the information stored in the security hardware registers because of a shutdown or power cutoff, and to restore it when the electronic system is restarted.

According to a second aspect, this invention relates to a method for executing a code comprising a plurality of functions by an electronic system configured for a secure execution of said code according to the method according to the first aspect and for applying during an execution of a function a security countermeasure configuration among a plurality of security countermeasure configurations and comprising a hardware processor and security hardware registers storing, for at least one function among said plurality of functions, a function start address and an associated security countermeasure configuration to be applied during an execution of said at least one function,
said method being performed by said electronic system and comprising, when code execution is switched from a first function to a second function:

determining if one of the security hardware registers stores the second function start address,
  when one of the security hardware registers stores the second function start address and an associated security countermeasure configuration, applying said stored security countermeasure configuration before executing said second function,
  when no security hardware register stores the second function start address, applying a predetermined security countermeasure configuration before executing said second function.

Such a method enables to efficiently protect parts of the code by activating during their execution the countermeasures needed to protect it from the kind of attacks that have already been detected during a previous execution of the code.

Applying said predetermined security countermeasure configuration may comprise deactivating all activated countermeasures.

When a function requires no protection, it enables to prevent any execution time increase that would be caused by unnecessarily activated countermeasures.

In an embodiment, said electronic system comprises a processor secure status hardware register (psr_sec) storing a start address of a function being executed and a current security countermeasure configuration, and:
  determining if one of the security hardware registers stores a second function start address comprises comparing the second function start address stored in said processor secure status hardware register (psr_sec) to the function start addresses stored in the security hardware registers (break(i)_sec),
  applying a security countermeasure configuration associated to the second function start address before executing said second function comprises activating security countermeasures required in the security countermeasure configuration associated to the second function start address and inactivated in the current security countermeasure configuration.

The method according to the second aspect may comprise: when code execution is switched from a first function to a second function, saving the content of the processor secure status hardware register storing the start address of the first function being executed and updating the processor secure status hardware register with the start address of the second function, and at the end of the execution of the second function and when execution goes back to the first function, reloading the saved content.

The step of determining if one of the security hardware registers stores a second function start address and/or the step of saving the content and of reloading the saved content may be performed by a dedicated hardware circuit.

According to a third aspect, this invention relates to a computer program product directly loadable into the memory of at least one computer, comprising software code instructions for performing the steps of the methods according to the first and second aspect of the invention when said product is run on the computer.

According to a fourth aspect, this invention relates to an electronic system comprising a hardware processor, security hardware registers and a detection system configured for performing the steps of the methods according to the first and second aspect of the invention.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

According to a first aspect, the invention relates to a method for configuring an electronic system 1 for a secure execution of a code comprising a plurality of functions. In order to protect the execution of such functions against attacks, the electronic system is able to apply, during the execution of a function, a security countermeasure configuration among a plurality of security countermeasure configurations.

Each security countermeasure configuration is defined by one or more countermeasures whose activation protects the electronic system against one or more kinds if attacks. Such countermeasures may comprise timing de-synchronization as clock jitter, power smoothing, activating code anti rerouting mechanism, and memory access redundancy.

Figure 1:
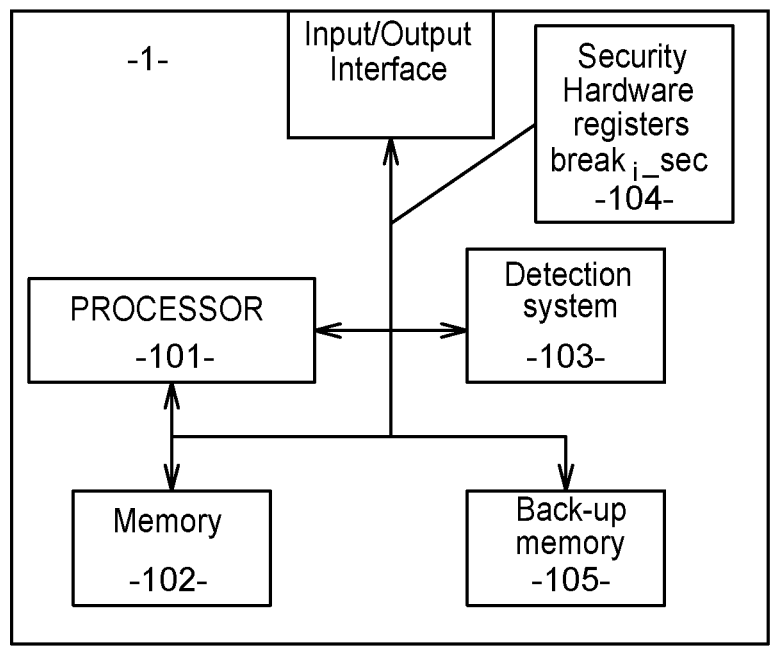
FIG. 1 is a schematic illustration of an electronic system according to the present invention.

Such an electronic system comprises, as depicted on FIG. 1, a hardware processor 101 for the execution of the code to be protected, and at least one memory 102, such as a Non Volatile memory, a RAM memory and/or a ROM memory in which the code is stored. The electronic system may also comprise a backup memory 105 such a Non Volatile memory, a One-Time Programmable memory, a hard disk drive . . . . Such an electronic system may for example be a tamperproof smartcard or computer.

The main idea of the invention is to activate countermeasures during the execution of functions that have undergone attacks during a previous execution. In order to do so, attacks are detected during operation of the electronic system. To this end, the electronic system comprises a detection system 103 configured to detect an attack on the electronic system during an execution of a function among the plurality of functions of the code to be protected. When an attack is detected, countermeasures to be activated for the next executions of the function are defined. It defines a security countermeasure configuration associated to the function which was running when the attack occurred. In order to memorize the defined security countermeasure configuration, the electronic system comprises security hardware registers 104 configured for storing start addresses of functions among the plurality of functions of the code and associated security countermeasure configurations to be applied during an execution of these functions. In the following paragraphs and in figures, such security hardware registers may be named $break_i\_sec$ with i an integer number.

In order to activate appropriate countermeasures during the execution of each function of the code, the electronic system checks at the beginning of the execution of a function if its start address is stored in any of the security hardware registers $break_i\_sec$. If a function start address is found, the associated configuration is applied by activating the required countermeasures, so that these countermeasures remain active all along the execution of the function associated therewith.

Figure 2:
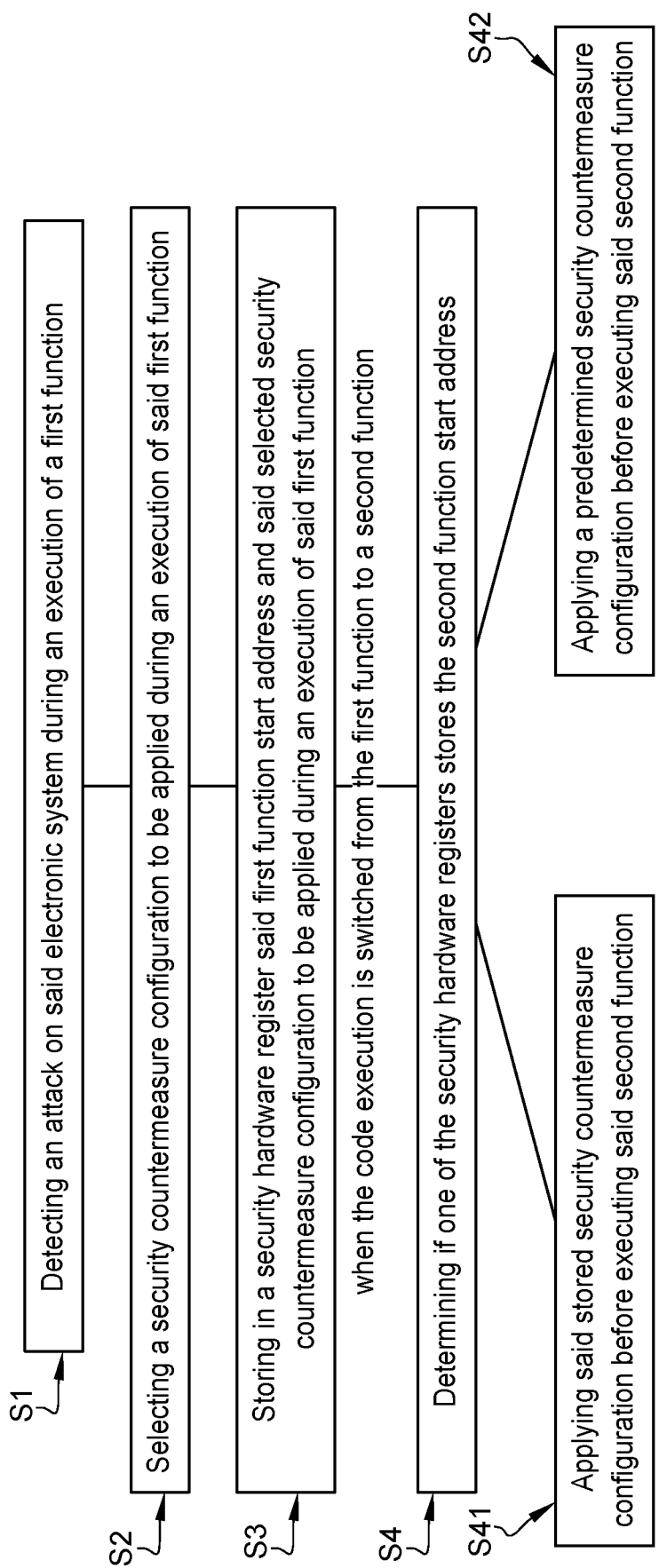
FIG. 2 is a schematic illustration of a method according to an embodiment of the present invention.

The following paragraphs describe in detail the steps, shown on FIG. 2, of the method for configuring the electronic system for a secure execution of a code according to the invention.

In a first step S1, the detection system of the electronic system detects an attack on said electronic system during an execution of a first function. This step may be performed continuously during operation of the electronic system until an attack is detected.

In a second step S2, the electronic system selects, based on the attack detected at the first step, a security countermeasure configuration to be applied during an execution of the first function. Such a security countermeasure configuration preferably comprises one or more countermeasures against the attack detected at the first step, such that this countermeasure configuration, when applied, triggers the countermeasures required to protect the electronic system against another execution of the detected attack.

In a third step S3, the electronic system stores in a security hardware register $break_i\_sec$ the first function start address and the selected security countermeasure configuration to be applied during an execution of the first function.

According to a second aspect, the following paragraphs describe in detail the steps, shown on FIG. 2, of the method for securely executing the code to be protected after the electronic system has been configured by applying at least once the first, second and third step.

In a fourth step S4, when the code execution is switched from a first function to a second function, the electronic system determines if one of the security hardware registers $break_i\_sec$ stores the second function start address. Such a step may be performed by a dedicated hardware circuit.

When one of the security hardware registers $break_i\_sec$ stores the second function start address in a step S41, the electronic system applies the stored security countermeasure configuration before executing the second function. By doing so, the execution of the second function is effectively protected by the activated countermeasures against the kind of attacks it has undergone during a previous execution.

When no security hardware register stores the second function start address, the second function does not need particular countermeasures to be activated. In that case, in a step S42, the electronic system may apply a predetermined security countermeasure configuration before executing the second function.

Such a predetermined security countermeasure configuration may just indicate that no countermeasure at all is needed. In that case, applying the predetermined security countermeasure configuration may comprise deactivating all activated countermeasures in order to speed up the execution of the second function.

The fourth step described above may be performed repeatedly each time a new function is called, in order to adapt the countermeasures configuration to next function to be executed.

The electronic system may at the same time perform on one hand the three first steps S1 to S3 in order to continuously detect new attacks and adapt the security countermeasure configurations stored in the security hardware registers; and on the other hand perform the fourth step S4 at each function switch in order adapt the applied countermeasures to the function being executed.

In order to memorize the content of the security hardware registers $break_i\_sec$ when the electronic system is powered down and to restore it at startup, the electronic system may comprise a backup memory 105, such as a NVM or One-Time Programmable memory, and after an attack is detected during the execution of a first function, the start address of said first function and said selected security countermeasure configuration stored in said security hardware register are copied from said security hardware register to said backup memory. At boot of the electronic system, the start addresses and associated security countermeasure configurations stored in said backup memory are copied from said backup memory to said security hardware registers.

In order to easily keep track of the current status of the electronic system, it may comprise a processor secure status hardware register psr_sec configured for storing the start address of the function being executed and the current security countermeasure configuration being applied. In such a case, in order to keep this register updated, a start address of the first function and the current security countermeasure configuration may be stored, at the beginning of an execution of a first function, in the processor secure status hardware register psr_sec.

Then, in the fourth step S4, when the code execution is switched from a first function to a second function, the content of the processor secure status hardware register psr_sec relating to the first function may be saved, for example in RAM or in dedicated hardware registers, and the processor secure status hardware register psr_sec may be updated with the start address of the second function. In this fourth step S4, determining if one of the security hardware registers $break_i\_sec$ stores the second function start address may comprise comparing the second function start address stored in the processor secure status hardware register psr_sec to the function start addresses stored in the security hardware registers $break_i\_sec$. Such a comparing step may be performed by a dedicated hardware circuit, for example by hardware comparators between each security hardware registers $break_i\_sec$ and the processor secure status hardware register psr_sec.

When one of the security hardware registers stores the second function start address, applying a security countermeasure configuration associated to the second function start address before executing said second function may then comprise activating the security countermeasures which are required in the security countermeasure configuration associated to the second function start address and which are inactivated in the current security countermeasure configuration that has been applied during the execution of the first function.

At the end of the execution of the second function, execution goes back to the first function and the previous state of the processor secure status hardware register psr_sec, which was saved when the execution switched to the second function, may be reloaded, for example from RAM or from dedicated hardware registers. Such a step may be performed by a dedicated hardware circuit.

Figure 3:
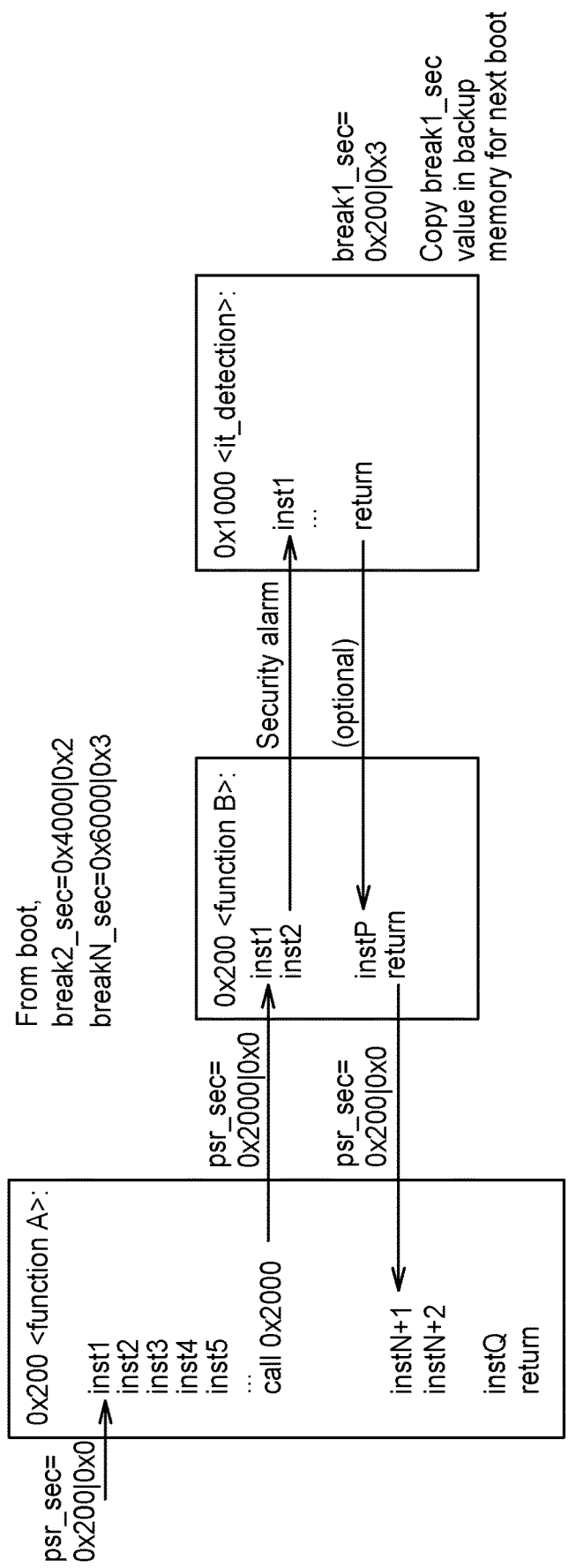
FIG. 3 is an example of configuration of an electronic device according to the present invention.

An example of configuration of the electronic system is shown on FIG. 3 which shows the operations performed during the detection of an attack during the execution of a function B called by a function A. First, function A is executed. At this time, the processor secure status hardware register psr_sec stores the start address of function A 0x200 and a security countermeasure configuration 0x0 indicating that no countermeasure is required. Then function B is called. The processor secure status hardware register psr_sec is updated with the start address of function B 0x2000. The detection of an attack raises a security alarm which leads to writing the start address of function B 0x2000 in one of the security hardware registers $break_1\_sec$. The electronic system determines that three countermeasures are required to prevent such an attack and therefore associates to the start address of function B 0x2000 a security countermeasure configuration 0x3 requiring the activation of these three countermeasures. The content of the security hardware register $break_1\_sec$ may be copied to the backup memory in order to be able to restore it at reboot.

Figure 4:
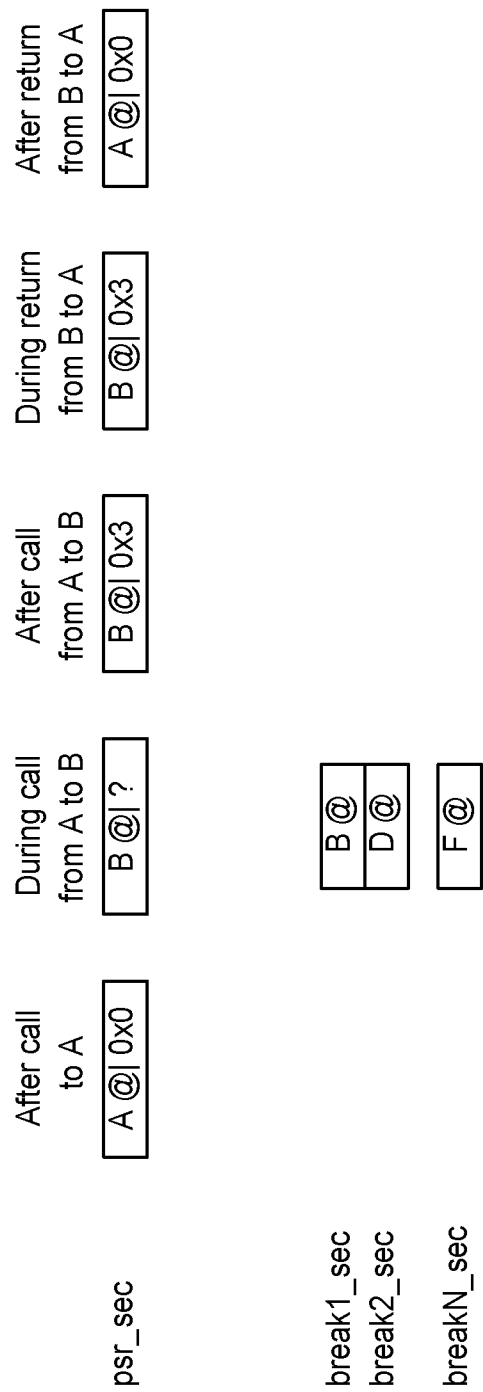
FIGS. 4 and 5 are schematic illustrations of an example of secure execution of a code according to the present invention.
Figure 5:
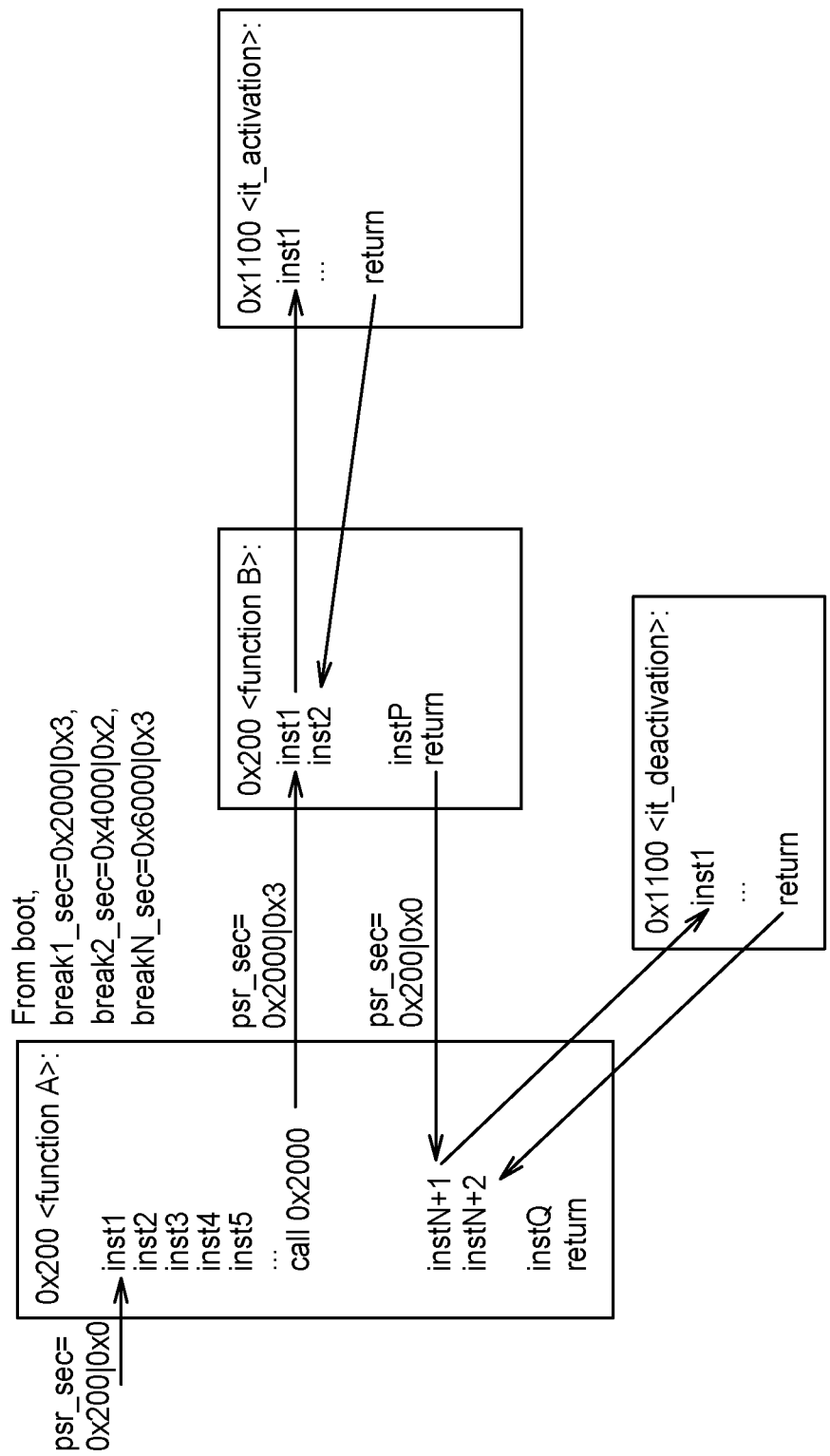

Following such a configuration, an example of secure execution of a code according to the invention is given on FIG. 4 and FIG. 5. This example shows an initial state of the electronic system in which a first function A is being executed and calls a second function B. It is supposed that three security hardware registers $break_1\_sec$, $break_2\_sec$ and $break_N\_sec$ store the start addresses of functions B (0x2000), D (0x4000) and F (0x6000) and the associated security countermeasure configurations—which are not shown on FIG. 4—but the start address of function A 0x200 is not stored in any of the security hardware registers. As a result, function A is being executed without any countermeasure activated. During the execution of function A, the processor secure status hardware register psr_sec stores the start address (A@ or 0x200) of function A, and the security countermeasure configuration 0x0 indicating that no countermeasure is required in this configuration. Then function B is called. The start address B@ 0x2000 of function B is copied to the processor secure status hardware register psr_sec and this start address is looked for in the security hardware registers. The security hardware register $break_1\_sec$ stores the start address B@ 0x2000 associated with the security countermeasure configuration 0x3 requiring the activation of three countermeasures. Since this security countermeasure configuration 0x3 is different than the previous one 0x0 applied to the execution of function A, the three countermeasures required in the security countermeasure configuration 0x3 and kept inactivated during the execution of function A are activated by a call to the activation function at the address 0x1100. After the execution of function B has started, the processor secure status hardware register psr_sec now stores the start address of function B@ 0x2000 and the associated security countermeasure configuration 0x3.

FIGS. 4 and 5 also show what happens when the execution of function B has ended and execution of function A resumes. At this time the processor secure status hardware register psr_sec still stores the start address of function B@ 0x2000 and the associated security countermeasure configuration 0x3. Function A start address 0x200 is not found in the security hardware registers. Therefore the predetermined security configuration 0x0 is applied, which deactivates the three countermeasures activated during the execution of function B, by a call to the deactivation function at the address 0x1100. After the execution of function B has started, the processor secure status hardware register psr_sec now stores again the start address of function A@ 0x200 and the associated security countermeasure configuration 0x0.

According to a third aspect, the invention relates to a computer program product directly loadable into the memory of at least one computer, comprising software code instructions for performing, when said product is run on the computer, the steps of the methods described here before.

In addition to these features, the method and the computer program according to the second and third aspects of the invention may be configured for performing or may comprise any other features described here before.

The electronic system and method presented here therefore enable to efficiently trigger the execution of additional countermeasures on specific parts of the code to be protected, with almost no footprint on this code and with a limited impact on the execution time since no countermeasure is activated during the execution of functions for which no protection is needed.

The invention claimed is:

1. A method for configuring an electronic system for a secure execution of a code comprising a plurality of functions, said electronic system being configured for applying during an execution of a function a security countermeasure configuration among a plurality of security countermeasure configurations, said method being performed by said electronic system comprising a hardware processor, security hardware registers configured for storing start addresses of functions among said plurality of functions and associated security countermeasure configurations to be applied during an execution of said functions, and a detection system configured to detect an attack on said electronic system during an execution of a function among said plurality of functions, and comprising:

detecting, by said detection system, an attack on said electronic system during an execution of a first function, selecting, based on said detected attack, a security countermeasure configuration to be applied during an execution of said first function, storing, in a security hardware register, a first function start address and said selected security countermeasure configuration to be applied during an execution of said first function, and determining if one of the security hardware registers stores a second function start address, when code execution is switched from the first function to a second function, wherein said electronic system comprises a backup memory, the start address of said first function and said selected security countermeasure configuration stored in said security hardware register are copied from said security hardware register to said backup memory after said detection of an attack, and at boot of the electronic system, the start address of the first function and the security countermeasure configuration stored in said backup memory are copied from said backup memory to said security hardware registers.

2. A method for executing a code comprising a plurality of functions by an electronic system configured for a secure execution of said code and for applying during an execution of a function a security countermeasure configuration among a plurality of security countermeasure configurations and comprising a hardware processor and security hardware registers storing, for at least one function among said plurality of functions, a function start address and an associated security countermeasure configuration to be applied during an execution of said at least one function, said method being performed by said electronic system and comprising, when code execution is switched from a first function to a second function:
    determining (S4) if one of the security hardware registers stores a second function start address,
    when one of the security hardware registers stores the second function start address and an associated security countermeasure configuration, applying (S41) said stored security countermeasure configuration before executing said second function,
    when no security hardware register stores the second function start address, applying (S42) a predetermined security countermeasure configuration before executing said second function,
    wherein the electronic system comprises a backup memory, the function start address and the associated security countermeasure configuration stored in the security hardware registers are copied from said security hardware registers to said backup memory after said detection of an attack, and at boot of the electronic system, the function start addresses and associated security countermeasure configurations stored in said backup memory are copied from said backup memory to said security hardware registers.

3. The method of claim 2, wherein applying said predetermined security countermeasure configuration comprises deactivating all activated countermeasures.

4. The method of claim 2, wherein said electronic system comprises a processor secure status hardware register (psr_sec) storing a start address of a function being executed and a current security countermeasure configuration, and wherein:
    determining if one of the security hardware registers stores a second function start address comprises comparing the second function start address stored in said processor secure status hardware register (psr_sec) to the function start addresses stored in the security hardware registers (break(i)_sec), and
    applying a security countermeasure configuration associated to the second function start address before executing said second function comprises activating security countermeasures required in the security countermeasure configuration associated to the second function start address and inactivated in the current security countermeasure configuration.

5. The method of claim 4, comprising: when code execution is switched from a first function to a second function, saving the content of the processor secure status hardware register (psr_sec) storing the start address of the first function being executed and updating the processor secure status hardware register (psr_sec) with the start address of the second function, and at the end of the execution of the second function and when execution goes back to the first function, reloading the saved content.

6. The method of claim 5, wherein the step of determining if one of the security hardware registers stores a second function start address and/or the step of saving the content and of reloading the saved content are performed by a dedicated hardware circuit.

7. A computer program product directly loadable into the memory of at least one computer, comprising software code instructions for
    configuring a secure execution of a code comprising a plurality of functions,
    applying during an execution of a function a security countermeasure configuration among a plurality of security countermeasure configurations,
    said at least one computer comprising a hardware processor, security hardware registers configured for storing start addresses of functions among said plurality of functions and associated security countermeasure configurations to be applied during an execution of said functions,
    determining when code execution is switched from a first function to a second function:
    determining (S4) if one of the security hardware registers stores a second function start address,
    when one of the security hardware registers stores the second function start address and an associated security countermeasure configuration, applying (S41) said stored security countermeasure configuration before executing said second function,
    when no security hardware register stores the second function start address, applying (S42) a predetermined security countermeasure configuration before executing said second function; and
    a detection system configured to detect an attack on said at least one computer during an execution of a function among said plurality of functions for:
    detecting, by said detection system, an attack on said at least one computer during an execution of a first function,
    selecting, based on said detected attack, a security countermeasure configuration to be applied during an execution of said first function, and
    storing, in a security hardware register, a first function start address and said selected security countermeasure configuration to be applied during an execution of said first function,
    wherein the first function start address and said selected security countermeasure configuration stored in said security hardware register are copied from said security hardware register to a backup memory after said detection of an attack, and at boot of the at least one computer, the first function start address and the associated security countermeasure configuration stored in said backup memory are copied from said backup memory to said security hardware registers.

8. An electronic system comprising a hardware processor, security hardware registers and a detection system configured for
    configuring a secure execution of a code comprising a plurality of functions,
    applying during an execution of a function a security countermeasure configuration among a plurality of security countermeasure configurations,
    determining when code execution is switched from a first function to a second function:

determining (S4) if one of the security hardware registers stores a second function start address, when one of the security hardware registers stores the second function start address and an associated security countermeasure configuration, applying (S41) said stored security countermeasure configuration before executing said second function, when no security hardware register stores the second function start address, applying (S42) a predetermined security countermeasure configuration before executing said second function; and a detection system configured to detect an attack on said electronic system during an execution of a function among said plurality of functions for:

detecting, by said detection system, an attack on said electronic system during an execution of a first function, selecting, based on said detected attack, a security countermeasure configuration to be applied during an execution of said first function, and storing, in a security hardware register, a first function start address and said selected security countermeasure configuration to be applied during an execution of said first function, wherein, said electronic system comprises a backup memory, the first function start address and said selected security countermeasure configuration stored in said security hardware register are copied from said security hardware register to said backup memory after said detection of an attack, and at boot of the electronic system, the first function start address and the associated security countermeasure configurations stored in said backup memory are copied from said backup memory to said security hardware registers.

* * * * *